(12) United States Patent
Fraccaroli et al.

(10) Patent No.: US 9,894,838 B2
(45) Date of Patent: Feb. 20, 2018

(54) BASECUTTER BLADE FOR A CANE HARVESTER

(71) Applicant: CNH America LLC, New Holland, PA (US)

(72) Inventors: Luis B. Fraccaroli, Itapira (BR); Walterely Souza, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 486 days.

(21) Appl. No.: 14/022,664

(22) Filed: Sep. 10, 2013

(65) Prior Publication Data
US 2015/0068183 A1    Mar. 12, 2015

(51) Int. Cl.
*A01D 34/40* (2006.01)
*A01D 45/10* (2006.01)

(52) U.S. Cl.
CPC .................... *A01D 45/10* (2013.01)

(58) Field of Classification Search
CPC ................ A01D 57/22; A01D 45/10
USPC .......... 56/94, 119, 126, 157, 294, 295, 504; 460/112, 113, 121
See application file for complete search history.

(56) References Cited

U.S. PATENT DOCUMENTS

| | | | |
|---|---|---|---|
| 712,976 A * | 11/1902 | Steele .................... | A01D 45/02 56/116 |
| 811,441 A * | 1/1906 | Robinson ............... | A01D 33/06 460/121 |
| 851,785 A | 4/1907 | Tilson | |
| 864,227 A * | 8/1907 | Brass .................... | A01D 45/025 460/32 |
| 1,121,740 A * | 12/1914 | Markham ............. | A01D 45/021 56/109 |
| 1,365,213 A * | 1/1921 | Woodland .............. | A01D 45/10 56/14.3 |
| 1,734,972 A * | 11/1929 | Johnson ............... | A01D 45/021 56/119 |
| 1,908,966 A * | 5/1933 | Falkiner ................. | A01D 75/18 56/10.3 |
| 1,964,579 A * | 6/1934 | Hyman ................ | A01D 45/021 56/119 |
| 2,213,906 A * | 9/1940 | Ebersol .................... | A01F 12/40 241/190 |
| 2,679,132 A * | 5/1954 | Christiance .......... | A01D 45/021 56/119 |
| 3,135,083 A * | 6/1964 | Czajkowski ........... | A01D 46/08 171/58 |
| 3,462,927 A * | 8/1969 | Quick .................... | A01D 45/10 56/119 |
| 3,643,409 A | 2/1972 | Jones | |
| 3,670,481 A | 6/1972 | Minet | |
| 3,772,864 A * | 11/1973 | Rodrigue ............... | A01D 45/10 56/10.7 |
| 3,848,399 A | 11/1974 | Makeham | |

(Continued)

FOREIGN PATENT DOCUMENTS

WO    8204176 A1    12/1982

*Primary Examiner* — Thomas B Will
*Assistant Examiner* — Joan D Misa
(74) *Attorney, Agent, or Firm* — Patrick M. Sheldrake

(57) ABSTRACT

A cane harvester including a support member and a basecutter assembly carried by the support member. The basecutter assembly has at least one rotating basecutter and a plurality of blades coupled thereto. The plurality of blades are not sharp.

20 Claims, 4 Drawing Sheets

(56) References Cited

U.S. PATENT DOCUMENTS

| | | | | |
|---|---|---|---|---|
| 3,905,182 A * | 9/1975 | Geier | A01D 34/736 | 56/13.6 |
| 3,930,354 A * | 1/1976 | Borderie | A01D 43/082 | 56/94 |
| 4,008,557 A | 2/1977 | Ruback et al. | | |
| 4,019,308 A * | 4/1977 | Quick | A01D 45/10 | 56/13.9 |
| 4,044,535 A * | 8/1977 | Alexandrino | A01D 45/10 | 56/15.8 |
| 4,098,060 A * | 7/1978 | Quick | A01D 45/10 | 56/13.9 |
| 4,099,365 A * | 7/1978 | Hudson | A01D 45/10 | 56/13.5 |
| 4,448,014 A * | 5/1984 | Klinner | A01D 34/66 | 56/13.6 |
| 4,594,842 A * | 6/1986 | Wolters | A01D 43/082 | 56/119 |
| 4,646,512 A * | 3/1987 | Scott | A01D 45/10 | 56/13.9 |
| 5,313,771 A * | 5/1994 | France | A01D 46/12 | 56/126 |
| 5,463,856 A * | 11/1995 | Beckwith | A01D 45/10 | 460/134 |
| 5,485,716 A * | 1/1996 | Baker | A01D 45/10 | 56/14.3 |
| 5,546,737 A | 8/1996 | Moosbrucker | | |
| 5,722,225 A * | 3/1998 | Wuebbels | A01D 43/082 | 56/119 |
| 5,934,054 A * | 8/1999 | Landeis | A01D 57/22 | 171/DIG. 1 |
| 6,026,635 A | 2/2000 | Staiger | | |
| 6,176,015 B1 * | 1/2001 | Morabit | A01D 34/4168 | 30/276 |
| 6,430,907 B2 * | 8/2002 | Wolters | 56/60 | |
| 7,621,477 B2 * | 11/2009 | Young | B02C 13/28 | 241/194 |
| 8,117,811 B1 * | 2/2012 | Hall | A01D 43/08 | 56/157 |
| 8,286,410 B2 * | 10/2012 | Priepke | A01D 45/021 | 56/119 |
| 2001/0003237 A1 * | 6/2001 | Wolters | A01D 45/021 | 56/64 |
| 2005/0034439 A1 | 2/2005 | Galea | | |
| 2009/0158700 A1 * | 6/2009 | Rickert | A01D 43/082 | 56/94 |
| 2012/0174554 A1 | 7/2012 | Grobmeier et al. | | |
| 2015/0181804 A1 * | 7/2015 | Arndt | A01D 34/006 | 56/11.9 |

* cited by examiner

US 9,894,838 B2

BASECUTTER BLADE FOR A CANE HARVESTER

BACKGROUND OF THE INVENTION

1. Field of the Invention

The present invention relates to cane harvesters, and, more particularly, to basecutters used in cane harvesters.

2. Description of the Related Art

Sugarcane harvesting or cut operations require a certain degree of precision for good crop yield. Ideally, the cut height should be substantially close to the surface of the ground so as to harvest the optimal crop without damage to the equipment and at minimal cost.

It is also important to ensure next year's crop by cutting near the ground without damaging or pulling out the stools of the cane. If the harvest cut is made above the ideal cut height, the higher than desirable cut will result in harvest losses in the form of unharvested raw material, perhaps occasioning the need for an additional harvesting cut to try to recover the remaining unharvested raw material, with additional expenditures of time and additional wear and tear upon the harvesting equipment, or the loss of revenue from the unharvested raw material.

If the harvest cut is made below the ideal cut height, various, other, undesirable consequences may result. A harvest cut below the ideal height will not only result in increased damage to the plant, thereby decreasing the long term productivity of the cane plantation, but also in higher mineral levels in the harvested cane, and will cause increased damage to the base cutter knives, resulting in accelerated wear of the knives due to the constant wear against the soil.

It is desirable to minimize the undesirable escape of cane in relation to the feed rollers, of obviating losses due to cane that drops to the soil and is not picked up by the cane harvester, and of avoiding high indices of minerals in the raw material processed by the cane harvester.

What is needed in the art is a way to effectively move the cane to the transport rollers while minimizing blade wear and protecting the cane stools.

SUMMARY OF THE INVENTION

The present invention provides inventive blades to enhance cane harvesting.

The invention in one form is directed to a cane harvester including a support member and a basecutter assembly carried by the support member. The basecutter assembly has at least one rotating basecutter and a plurality of blades coupled thereto. The plurality of blades are not sharp.

The invention in another form is directed to a basecutter assembly for use with a cane harvester with a support member, the basecutter assembly being carried by the support member. The basecutter assembly has at least one rotating basecutter and a plurality of blades coupled thereto. The plurality of blades are blunt.

An advantage of the present invention is that the sugarcane is facilitated in its entrance into the transporter rollers.

Another advantage is that the blades catch the sugarcane more closely to the ground.

Yet another advantage is that the blades avoid a second base cutting of the sugarcane.

Still yet another advantage of the present invention is that the features of the blades contribute to decreased field losses of the sugarcane.

Further still another advantage is that the blades are mountable to the discs of the original basecutter mechanisms.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
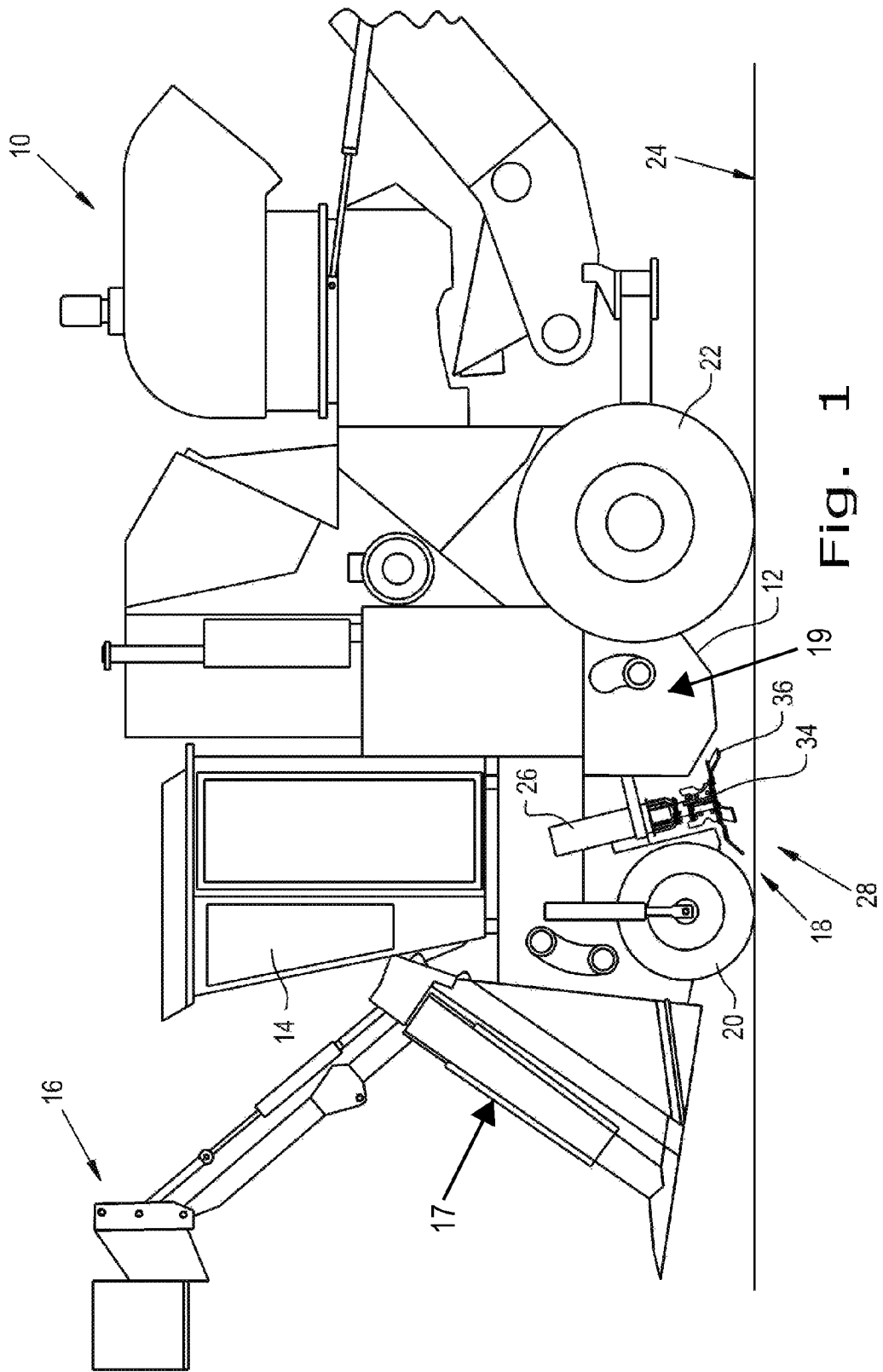
FIG. 1 is a partial side view depicting, partly in representational form, a sugarcane harvester having an embodiment of a basecutter constructed in accordance with the present invention.

Referring now to the drawings, and more particularly to FIG. 1, there is shown a cane harvester 10, which generally includes a chassis 12, a cab 14, a topper 16, a row divider 17, a basecutter assembly 18, a set of rollers 19, a pair of front wheels 20 and a pair of rear wheels 22, upon a ground surface 24. A support member 26 couples basecutter assembly 18 to chassis 12.

Although sugarcane harvester 10 is depicted having wheels 20 and 22, it will be appreciated that tracks or other support mechanisms could be equally as well employed and are not considered critical to the present invention or its practice.

Figure 2:
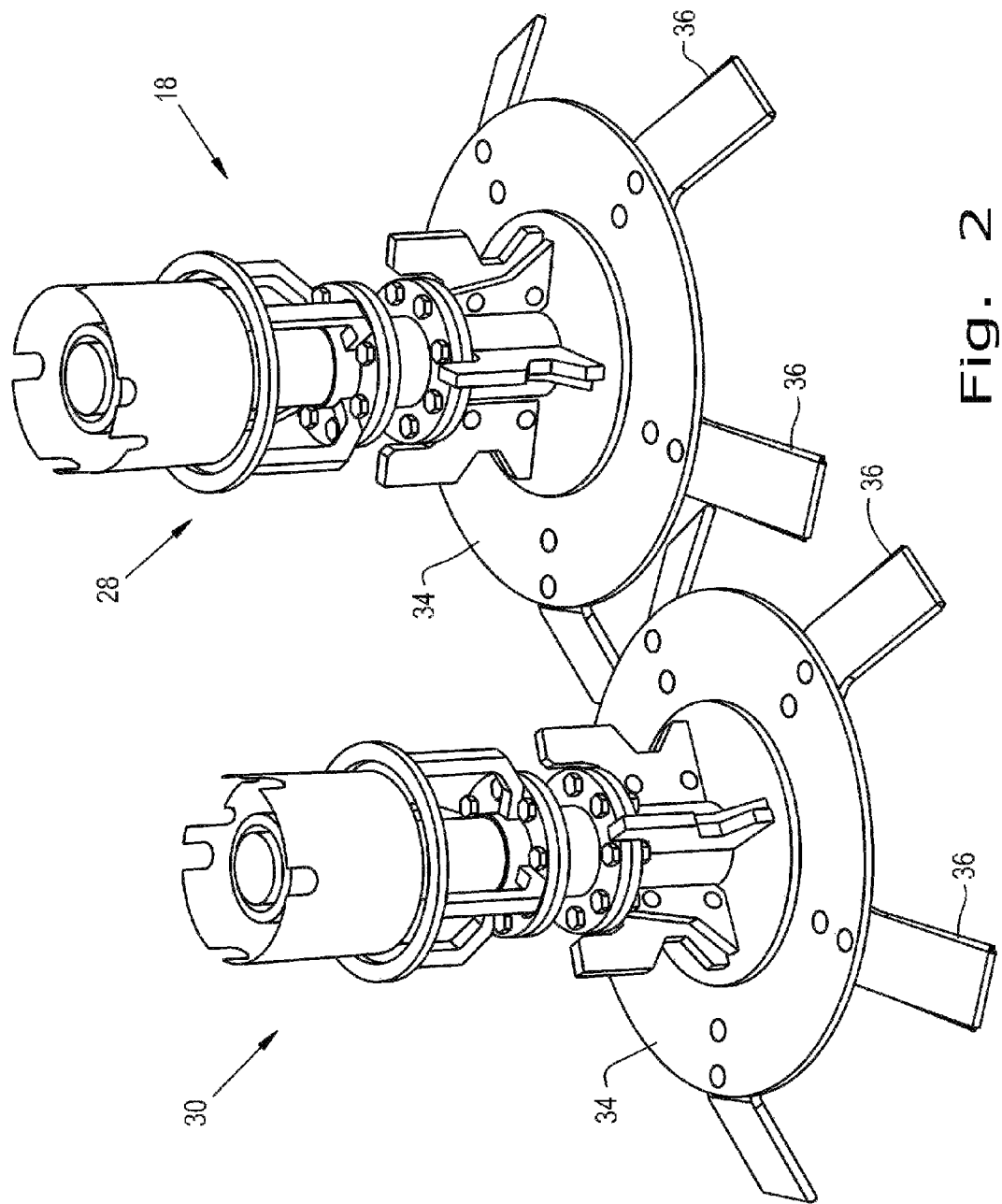
FIG. 2 is a perspective view of a basecutter assembly used in the cane harvester of FIG. 1.
Figure 3:
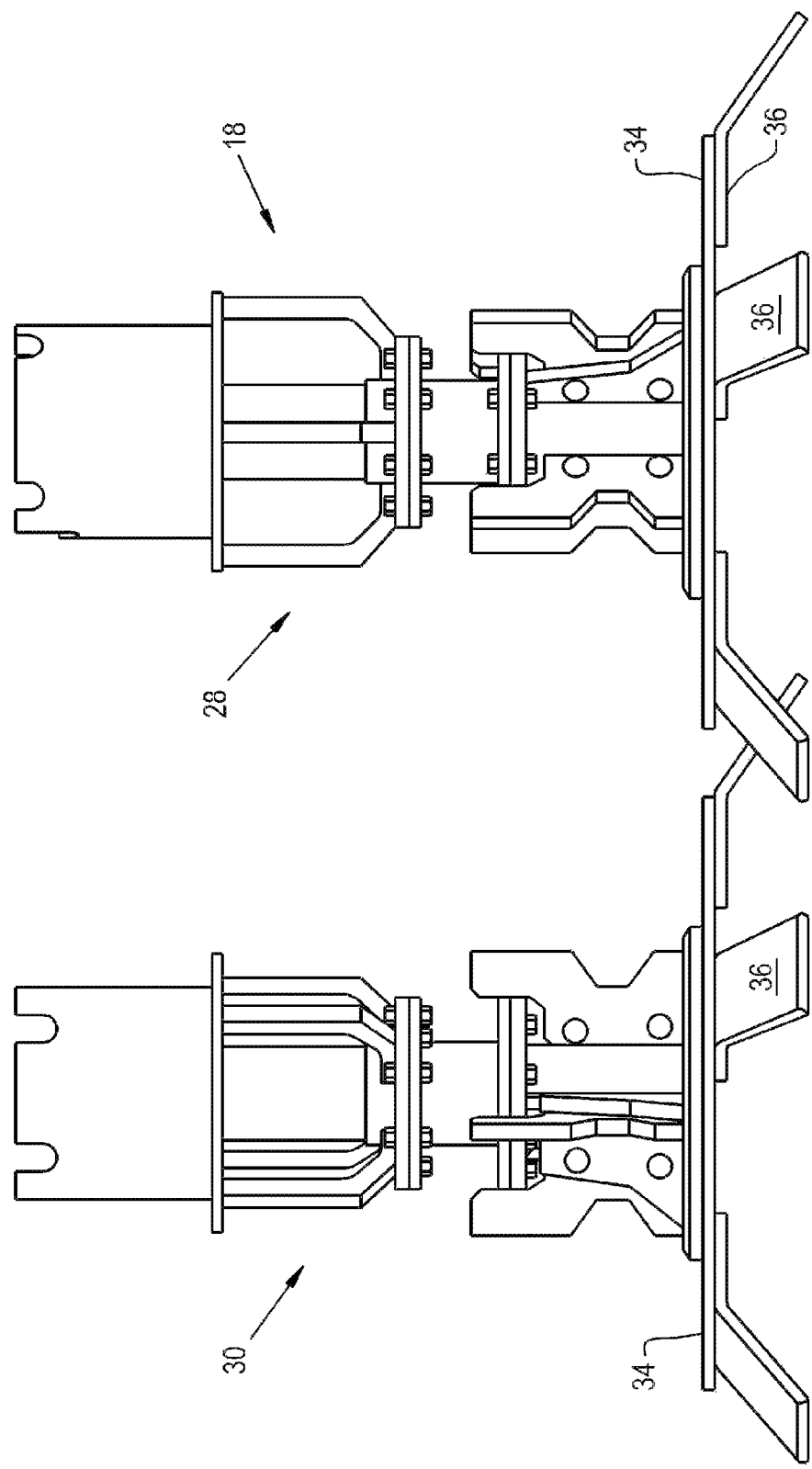
FIG. 3 is a front view of the basecutter assembly of FIGS. 1 and 2.

Now, additionally referring to FIGS. 2 and 3, there is shown additional details of basecutter assembly 18. Basecutter assembly 18 is shown in FIG. 1 as being connected to chassis 12 by way of support member 26. In the preferred embodiment depicted, basecutter assembly 18 includes a basecutter 28 and a basecutter 30 configured to function in a counter rotating manner. Basecutters 28 and 30 are driven by a hydraulic motor (not shown), which is operatively coupled through a gear box to drive rotary cutter discs 34 equipped with blades 36. The hydraulic motor is operatively connected to a hydraulic pump, typically positioned proximate to the engine of harvester 10.

Figure 4:
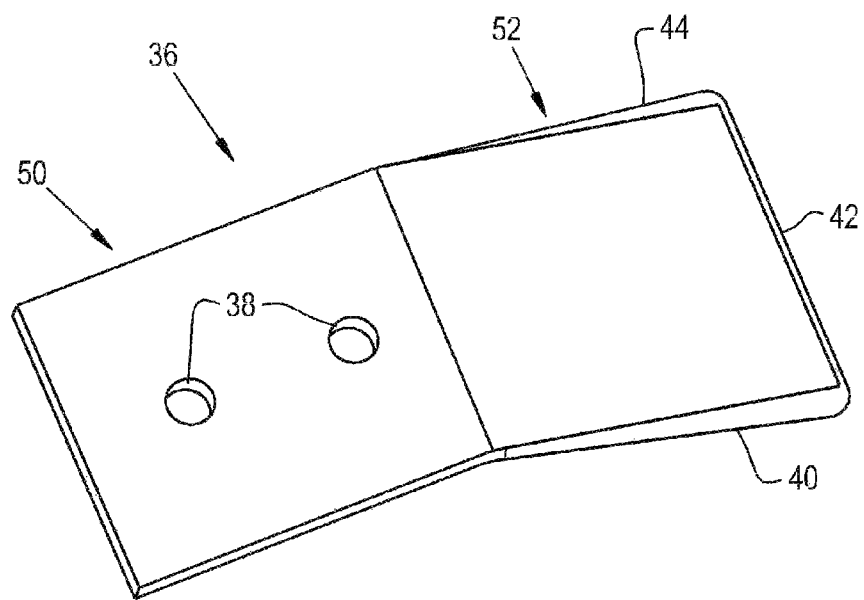
FIG. 4 is a perspective view of one of the blades used by the basecutter assembly of FIGS. 1-3.
Figure 5:
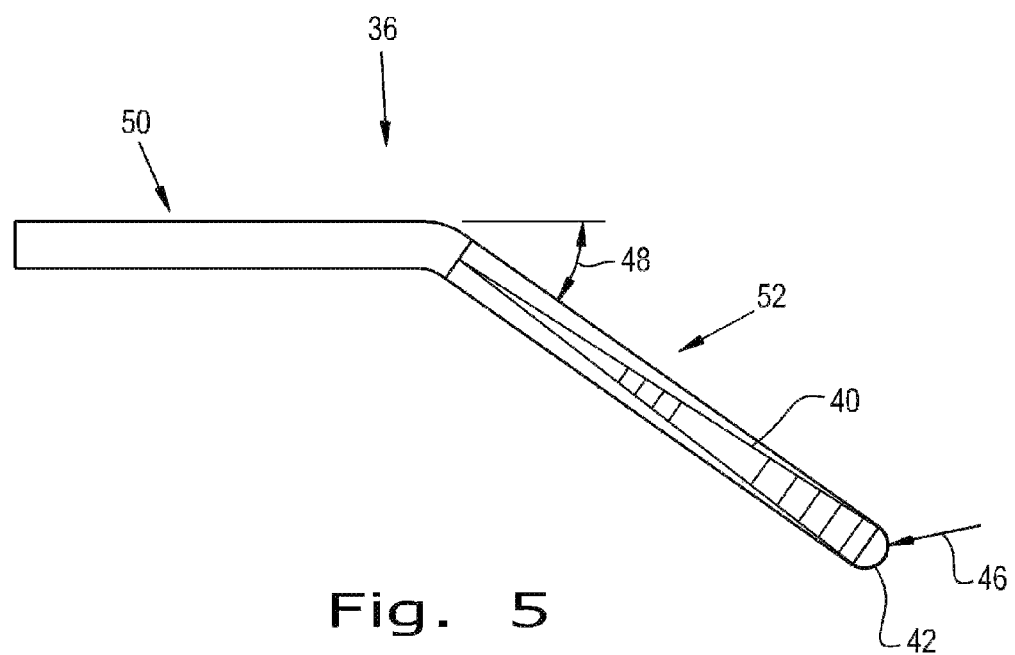
FIG. 5 is a side view of the blade of FIG. 4.

Now, additionally referring to FIGS. 4 and 5, there are shown more details of blades 36. The use of the term "basecutter" herein is for convenience and not to infer that the basecutter cuts the cane. Contrary to the prior art, blades 36 are not sharp, rather they have blunt edges to facilitate the entrance of the sugarcane to the transporter rollers. A separate cutting mechanism is responsible for the actual cutting of the cane. Blades 36 include mounting holes 38, and edges 40, 42, and 44. Edges 40, 42 and 44 are, at least partially, a convex radiused edge having a radius 46 that is approximately one half of the thickness of blade 36. As can be seen in the figures, edges 40 and 44 may be a tapered radiused edge where the portion closest to edge 42 is thicker in nature and it tapers off as the edge departs from edge 42. An angle 48 defines a transition from a mounting portion 50 of blade 36 to a crop engaging portion 52 of blade 36. Angle 48 is shown as being a 35 degree angle as a departure angle from being a straight blade, thus blade 36 is a non-straight blade.

Mounting holes 38 allow blades 36 to be fastened to discs 34, with mounting holes being located in a mounting portion 50 of blade 36. Crop engaging portion 52 has edges 40, 42, and 44 formed by way of a welding process to add material to the metal resulting in the blunt, non-sharp, more wear resistant, radiuses of crop engaging portion 52.

Advantageously, blade 36 has a bent shape and does not have a sharp edge, each of these features being absent in the prior art. These features present at least 3 advantages. First, as mentioned previously, the sugarcane is facilitated by blades 36 in their entrance to the transporter rollers. Secondly, blades 36 catch the sugarcane more closely to the ground. Thirdly, the use of blades 36 avoids a second base cutting of the sugarcane. The features of blade 36 contribute to decreased field losses of the sugarcane. Yet another advantage is that blades 36 are mountable to the discs of the original basecutter mechanisms.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A self-propelled cane harvester, comprising:
a chassis;
a row divider carried by said chassis at a front end of said chassis;
a support member carried by said chassis behind said row divider;
a basecutter assembly carried by said support member, said basecutter assembly including:
at least one rotating basecutter; and
a plurality of blades inflexibly fastened to said at least one basecutter; and
a set of transport rollers to convey cut sugarcane into an opening in said chasis, said set of transport rollers placed next to and behind said at least one rotating basecutter;
wherein said plurality of blades being not sharp such that previous cut sugar cane is lifted toward the transport rollers.

2. The cane harvester of claim 1, wherein at least one of said plurality of blades has a substantially rectangular shape forming lateral, front and back edges, and wherein at least part of said edges are convexly rounded.

3. The cane harvester of claim 2, wherein said at least part of said edges is rounded having a radius that is approximately one half of a thickness of the blade.

4. The cane harvester of claim 1, wherein at least one of said plurality of blades has a non-straight profile.

5. The cane harvester of claim 4, wherein at least one of said plurality of blades has a straight portion and an angled portion.

6. The cane harvester of claim 5, wherein the angle is approximately 35 degrees.

7. The cane harvester of claim 5, wherein said at least one of said plurality of blades has a mounting portion and a crop engaging portion with said angle being a transition therebetween.

8. The cane harvester of claim 7, wherein said crop engaging portion has lateral and front edges forming three edges, and wherein each edge is rounded along its length.

9. The cane harvester of claim 8, wherein said rounded edges include at least one tapered rounded edge such that the crop engaging portion closest to the rounded edge is thicker and it tapers off moving away from the edge.

10. The cane harvester of claim 9 wherein said at least one of said plurality of blades have a leading edge and a trailing edge, both said leading edge and said trailing edge being tapered rounded edges.

11. A basecutter assembly for use on a self-propelled cane harvester comprising a chassis, a row divider carried by said chassis at the front end of said chassis, having a support member that carries the basecutter assembly, the basecutter assembly comprising:
at least one rotating basecutter connected to said support member behind said row divider and forward and adjacent to a set of transport rollers configured to convey cut sugarcane into an opening in the chassis;
a plurality of blades inflexibly fastened to said at least one basecutter; and
wherein said plurality of blades are blunt and shaped to lift previously cut sugar cane toward the transport rollers.

12. The basecutter assembly of claim 11, wherein at least one of said plurality of blades has substantially rectangular shape forming lateral, front and back edges, and wherein at least part of said edges are convexly rounded.

13. The basecutter assembly of claim 12, wherein said at least part of edges is rounded having a radius that is approximately one half of a thickness of the blade.

14. The basecutter assembly of claim 11, wherein at least one of said plurality of blades has a non-straight profile.

15. The basecutter assembly of claim 14, wherein at least one of said plurality of blades has a straight portion and an angled portion.

16. The basecutter assembly of claim 15, wherein the angle is approximately 35 degrees.

17. The basecutter assembly of claim 15, wherein said at least one of said plurality of blades have a mounting portion and a crop engaging portion with said angle being a transition therebetween.

18. The basecutter assembly of claim 17, wherein said crop engaging portion has lateral and front edges forming three edges, and wherein each edge is rounded along its length.

19. The basecutter assembly of claim 18, wherein said rounded edges include at least one tapered rounded edge.

20. The basecutter assembly of claim 19 wherein said at least one of said plurality of blades have a leading edge and a trailing edge, both said leading edge and said trailing edge being tapered rounded edges.

* * * * *